United States Patent
Ogata et al.

(10) Patent No.: US 9,114,808 B2
(45) Date of Patent: Aug. 25, 2015

(54) POWER TRANSMISSION APPARATUS

(75) Inventors: Nagahiro Ogata, Fukuoka (JP); Kenji Miyakawa, Fukuoka (JP)

(73) Assignee: YANMAR CO., LTD. (JP)

( * ) Notice: Subject to any disclaimer, the term of this patent is extended or adjusted under 35 U.S.C. 154(b) by 221 days.

(21) Appl. No.: 13/882,015

(22) PCT Filed: Oct. 21, 2011

(86) PCT No.: PCT/JP2011/074295
§ 371 (c)(1),
(2), (4) Date: Apr. 26, 2013

(87) PCT Pub. No.: WO2012/057024
PCT Pub. Date: May 3, 2012

(65) Prior Publication Data
US 2013/0211655 A1    Aug. 15, 2013

(30) Foreign Application Priority Data

Oct. 27, 2010   (JP) .................................. 2010-241105

(51) Int. Cl.
*B60W 20/00* (2006.01)
*E02F 9/20* (2006.01)
*F02D 29/02* (2006.01)
(Continued)

(52) U.S. Cl.
CPC .............. *B60W 20/40* (2013.01); *B60W 10/02* (2013.01); *B60W 10/06* (2013.01); *B60W 10/26* (2013.01); *E02F 9/2075* (2013.01); *E02F 9/2079* (2013.01); *E02F 9/2246* (2013.01); *E02F 9/2292* (2013.01); *E02F 9/2296* (2013.01); *F02D 29/02* (2013.01); *F02D 29/04* (2013.01);
(Continued)

(58) Field of Classification Search
CPC ..... E02F 9/2296; E02F 9/2246; E02F 9/2292; E02F 9/2075; E02F 9/2079; B60W 2600/00; B60W 20/40; B60W 10/02; B60W 10/06; B60W 10/26; Y10S 903/93; F02D 29/02; F02D 29/04
See application file for complete search history.

(56) References Cited

U.S. PATENT DOCUMENTS

| 6,026,921 A * | 2/2000 | Aoyama et al. ............ 180/65.25 |
| 8,573,339 B2 * | 11/2013 | Futahashi et al. .......... 180/65.21 |
| 2013/0221751 A1 * | 8/2013 | Miyakawa et al. ............. 307/72 |

FOREIGN PATENT DOCUMENTS

| JP | 2001-12275 A | 1/2001 |
| JP | 2001-99103 A | 4/2001 |
| JP | 2008-7089 A | 1/2008 |

OTHER PUBLICATIONS

International Search Report for International application No. PCT/JP2011/074295, mailed Jan. 24, 2012, with English translation.

*Primary Examiner* — Nicholas Kiswanto
(74) *Attorney, Agent, or Firm* — Cantor Colburn LLP

(57) ABSTRACT

The power transmission apparatus may include a control device to carry out idling stop control in such a manner that, when it is detected that an operating means is not operated for a predetermined time or more, an engine is stopped, and a clutch is disconnected, and the supply of the electric power from a battery to a motor generator is interrupted, and when it is detected that the operating means is operated afterwards, the engine is started by a cell motor, and the supply of the electric power from the battery to the motor generator is permitted, and the clutch is connected after the number of revolutions Ne of the engine reaches a predetermined value or more, and the supply of the electric power from the battery to the motor generator is interrupted.

2 Claims, 6 Drawing Sheets

(51) Int. Cl.

| | | |
|---|---|---|
| *F02D 29/04* | (2006.01) | |
| *B60W 10/02* | (2006.01) | |
| *B60W 10/06* | (2006.01) | |
| *B60W 10/26* | (2006.01) | |
| *E02F 9/22* | (2006.01) | |

(52) U.S. Cl.
CPC ........... *B60W 2600/00* (2013.01); *Y10S 903/93* (2013.01)

POWER TRANSMISSION APPARATUS

This is the U.S. National Stage of Application No. PCT/JP2011/074295, filed on 21 Oct. 2011. Priority under 35 U.S.C. §119(a) and 35 U.S.C. §365(b) is claimed from Japanese Application No. 2010-241105, filed 27 Oct. 2010, the disclosure of which is also incorporated herein by reference.

TECHNICAL FIELD

The present invention relates to a technology of a power transmission apparatus in which an engine and an electric motor are used.

BACKGROUND ART

Conventionally, there has been known a technology regarding a power transmission apparatus in which an engine is automatically stopped or started in predetermined cases. For example, see the description disclosed by patent document 1.

The power transmission apparatus disclosed by patent document 1 includes an engine which serves as a power source, a hydraulic pump to discharge hydraulic oil, a clutch interposed between an output shaft of the engine and an input shaft of the hydraulic pump, an electric motor (electric motor) connected to the input shaft of the hydraulic pump, a flywheel fixedly disposed on the input shaft of the electric motor, an actuator to be driven based on the hydraulic oil supplied from the hydraulic pump, and an operating means configured to operate the actuator.

When load applied to the actuator is close to zero, the clutch is disconnected, and the engine is stopped, and the hydraulic pump is driven by the electric motor. Also, when the operating means is operated by an operator in a state where the engine is stopped (that is, when it is predicted that the load is applied to the actuator), the clutch is connected, and the engine is restarted by the inertia of the flywheel or the driving force of the electric motor.

Thus, when the load is not applied to the actuator, that is, when an operation is not carried out, the engine is stopped, thereby preventing wasteful fuel consumption, and when the operation is restarted by the actuator, the engine can swiftly be started.

However, regarding the power transmission apparatus disclosed by patent document 1, the electric motor to drive the hydraulic pump is used as a starter motor to start the engine. Accordingly, when the engine is restarted, there is a case where the number of revolutions of the electric motor is reduced. In this case, the number of revolutions of the hydraulic pump is reduced along with the reduction of the number of revolutions of the electric motor, which reduces the flow rate of the hydraulic oil supplied to the actuator. Accordingly, there is a disadvantage in that the operating speed of the actuator is reduced, and the operation feeling of the actuator used by the operator deteriorates.

RELATED ART DOCUMENT

Patent Document

[Patent Document 1] Japanese Unexamined Patent Application Publication No. 2001-99103.

DISCLOSURE OF THE INVENTION

Problems to be Solved by the Invention

It is an object of the present invention to provide a power transmission apparatus that can suppress wasteful fuel consumption and prevent the deterioration of the operation feeling of an actuator at the time of restarting an engine.

Means of Solving the Problems

The problems to be solved by the present invention have been described hereinabove, and subsequently, the means of solving the problems will be described below.

That is, according to one aspect of the present invention, a power transmission apparatus may include a battery, an electric motor configured to be drivingly rotated based on supply of electric power from the battery, an engine, a cell motor configured to start the engine, at least a hydraulic pump configured to be driven by the electric motor or the engine, a clutch configured to connect and disconnect motive power transmitted from the engine to the hydraulic pump, a switching means configured to permit or interrupt the supply of the electric power from the battery to the electric motor, an operating means configured to operate a working hydraulic actuator, an operating state detecting means configured to detect whether the operating means is operated, an engine revolution detecting means configured to detect the number of revolutions of the engine, a pump revolution detecting means configured to detect the number of revolutions of the hydraulic pump, and a control device configured to carry out idling stop control in such a manner that, when it is detected that the operating means is not operated for a predetermined time or more, the engine is stopped, and the clutch is disconnected, and the supply of the electric power from the battery to the electric motor is interrupted, and when it is detected that the operating means is operated afterwards, the engine is started by the cell motor, and the supply of the electric power from the battery to the electric motor is permitted, and the clutch is connected after the number of revolutions of the engine reaches a predetermined value or more, and the supply of the electric power from the battery to the electric motor is interrupted.

According to another aspect of the present invention, the power transmission apparatus may further include a pressure detecting means configured to detect discharging pressure of the hydraulic pump, and a volume detecting means configured to detect displacement volume of the hydraulic pump, and wherein the control device calculates absorbing horsepower of the hydraulic pump, based on detection values by the pressure detecting means, the volume detecting means, and the pump revolution detecting means, wherein, with respect to the idling stop control, when it is detected that the operating means is operated, and the absorbing horsepower is less than a predetermined value, the control device permits the supply of the electric power from the battery to the electric motor without starting the engine, and wherein, when the absorbing horsepower is equal to or higher than a predetermined value, the control device allows the engine to start.

According to another aspect of the present invention, the power transmission apparatus may further include an idling stop selecting means configured to select whether to carry out the idling stop control, wherein, when the selection that the idling stop control is not carried out is made by the idling stop selecting means, the control device does not carry out the idling stop control.

Effects of the Invention

The embodiments of the present invention provide the following advantageous effects.

According to one aspect of the present invention, when the working hydraulic actuator is operated, the engine is stopped, whereby the wasteful fuel consumption can be suppressed. When the engine is restarted, the hydraulic pump is driven by the electric motor until the number of revolutions of the engine reaches a predetermined value or more. After the number of revolutions of the engine reaches the predetermined value or more, the hydraulic pump is driven by the engine. Accordingly, even when the number of revolutions of the engine is low immediately after the restart of the engine, the reduction of the number of revolutions of the hydraulic pump can be prevented and the reduction of the flow rate of the hydraulic oil discharged by the hydraulic pump can be prevented. Therefore, the deterioration of the operation feeling of the working hydraulic actuator at the time of restarting the engine can be prevented.

Further, the clutch is disconnected at the time of restarting the engine, so that the addition of the starting torque of the hydraulic pump to the engine can be prevented. Consequently, even when the viscosity of the hydraulic oil is high, in particular, in the low temperature environment, and the starting torque of the hydraulic pump becomes higher than the starting torque in an ordinary temperature, the deterioration of the startability of the engine can be prevented.

According to another aspect of the present invention, when the absorbing horsepower of the hydraulic pump is low (in light load works), the hydraulic pump can be driven only by the electric motor without starting the engine. Accordingly, the fuel consumption can be suppressed, and the hydraulic pump can be driven by the electric motor that has large low-speed torque and enables smooth rotation, and the workability can be improved.

According to another aspect of the present invention, the operator can arbitrarily select whether to carry out the idling stop control.

DESCRIPTION OF THE REFERENCE NUMERAL

Figure 1:
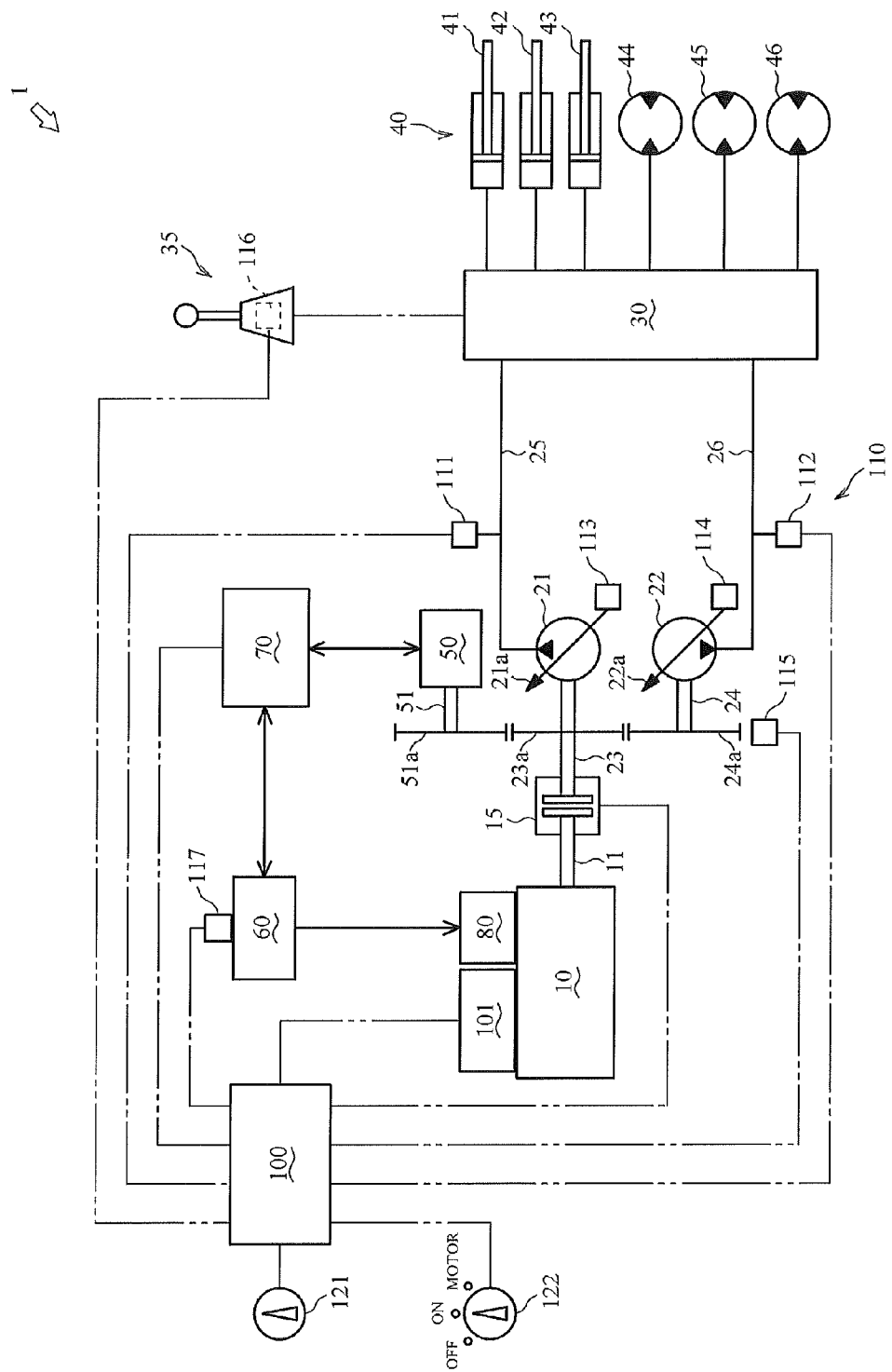
FIG. 1 is a block diagram illustrating the entire configuration of a power transmission apparatus according to a first embodiment of the present invention.

1 Power transmission apparatus
10 Engine
15 Clutch
21 First hydraulic pump (hydraulic pump)
22 Second hydraulic pump (hydraulic pump)
35 Operating means
50 Motor generator (electric motor)
60 Battery
70 Inverter (switching means)
80 Cell motor
100 Main controller (control device)
101 Engine controller unit (control device)
110 Absorbing horsepower detecting means
111 First pressure detecting means (pressure detecting means)
112 Second pressure detecting means (pressure detecting means)
113 First volume detecting means (volume detecting means)
114 Second volume detecting means (volume detecting means)
115 Pump revolution detecting means
116 Operating state detecting means
117 Charging state detecting means
122 Idling stop selecting means

BEST MODE FOR CARRYING OUT THE INVENTION

Hereinafter, a power transmission apparatus 1 according to a first embodiment of the present invention will be described referring to FIG. 1.

The power transmission apparatus 1 transmits motive power from a driving source and drives various actuators.

The power transmission apparatus 1 includes an engine 10, a first hydraulic pump 21, a second hydraulic pump 22, a clutch 15, a control valve 30, a working hydraulic actuator 40, an operating means 35, a motor generator 50, a battery 60, an inverter 70, a cell motor 80, an absorbing horsepower detecting means 110, an operating state detecting means 116, a charging state detecting means 117, an engine revolution setting means 121, an idling stop selecting means 122, an engine controller unit 101, and a main controller 100.

The power transmission apparatus 1 according to the embodiment of the present invention is included in a hydraulic excavator, but is not limited to this. That is, the power transmission apparatus 1 may be included in a construction equipment vehicle, an agricultural equipment vehicle, an industrial vehicle, and the like, other than the hydraulic excavator. Also, the present invention is not limited to vehicles, but may be included in machines and apparatuses that transmit motive power from a driving source and drive various actuators.

The engine 10 serves as a driving source. The motive power from the engine 10 can be taken out from the output shaft 11 provided in the engine 10.

The engine 10 according to the embodiment of the present invention is a diesel engine, but the present invention is not limited to this, and a gasoline engine may be applied.

The first hydraulic pump 21 is a hydraulic pump and a load according to the first embodiment of the present invention and drivingly rotated by the motive power to be transmitted and discharges the hydraulic oil. The first hydraulic pump 21 is a variable capacity type pump in which the discharge amount of the hydraulic oil is changeable by changing the tilt angle of a movable cam plate 21a. The tilt angle of a movable cam plate 21a can be changed by an actuator not shown or through manual operations. The first hydraulic pump 21 is drivingly rotated by the motive power inputted from the input shaft 23 provided in the first hydraulic pump 21. A gear 23a is fixedly disposed on the input shaft 23. One end of an oil path 25 is connected to the discharge port of the first hydraulic pump 21.

The second hydraulic pump 22 is the hydraulic pump and load according to the first embodiment of the present invention and drivingly rotated by the power to be transmitted and discharges the hydraulic oil. The second hydraulic pump 22 is a variable capacity type pump in which the discharge amount of the hydraulic oil is changeable by changing the tilt angle of a movable cam plate 22a. The tilt angle of a movable cam plate 22a can be changed by an actuator not shown or through manual operations. The second hydraulic pump 22 is drivingly rotated by the motive power inputted from the input shaft 24 provided in the second hydraulic pump 22. A gear 24a is fixedly disposed on the input shaft 24. The gear 24a is engaged with the gear 23a fixedly disposed on the input shaft 23. One end of an oil path 26 is connected to the discharge port of the second hydraulic pump 22.

Also, the number of teeth of the gear 24a is set in such a manner as to correspond to the number of teeth of the gear 23a. Accordingly, when the gear 23a and the gear 24a rotate while engaged with each other, the number of revolutions of the gear 23a and the gear 24a is equal in number. That is, the first hydraulic pump 21 and the second hydraulic pump 22 rotate based on the same number of revolutions.

The first hydraulic pump 21 and the second hydraulic pump 22 according to the embodiment of the present invention are a cam plate type hydraulic pump in which the discharge amount of the hydraulic oil can be changed by changing the tilt angles of the movable cam plate 21a and a movable cam plate 22a respectively, but the present invention is not limited to this. That is, a bent axis type hydraulic pump in which the discharge amount of the hydraulic oil can be changed by changing the tilt angle of the central axis of a cylinder block may be applied.

The clutch 15 is interposed between the output shaft 11 of the engine 10 and the input shaft 23 of the first hydraulic pump 21, and aimed at connecting and disconnecting motive power to be transmitted between the output shaft 11 and the input shaft 23. When the clutch 15 is connected, the output shaft 11 and the input shaft 23 are linked. In this case, the output shaft 11 and the input shaft 23 are rotatable based on the same number of revolutions, whereby the engine 10, the first hydraulic pump 21, and the second hydraulic pump 22 become rotatable on the same number of revolutions. When the clutch 15 is disconnected, the link between the output shaft 11 and the input shaft 23 is released, and even when the output shaft 11 of the engine 10 rotates, the rotational motive power is not transmitted to the input shaft 23.

Regarding the clutch 15, various clutches such as a hydraulic clutch and an electromagnetic clutch can be applied.

The control valve 30 is aimed at appropriately switching the direction and the flow rate of the hydraulic oil supplied from the first hydraulic pump 21 and the second hydraulic pump 22. The control valve 30 appropriately includes a directional switching valve, a pressure compensation valve, and the like.

The control valve 30 is connected to the other end of the oil path 25, and the hydraulic oil discharged from the first hydraulic pump 21 via the oil path 25 is supplied to the control valve 30.

The control valve 30 is connected to the other end of the oil path 26, and the hydraulic oil discharged from the second hydraulic pump 22 via the oil path 26 is supplied to the control valve 30.

The working hydraulic actuator 40 is driven by the hydraulic oil supplied from the first hydraulic pump 21 and the second hydraulic pump 22 via the control valve 30. The working hydraulic actuator 40 according to the embodiment of the present invention includes a boom cylinder 41 to operate the working machine of the hydraulic excavator, an arm cylinder 42, a bucket cylinder 43, a symmetrical pair of travelling motors 44 and 45 for travelling, and a rotation motor 46 for rotation.

The operating means 35 is aimed at switching the direction and the flow rate of the hydraulic oil supplied to the working hydraulic actuator 40 via the control valve 30. When the operating means 35 is operated by an operator, the operating signal (electric signal) is transmitted to the control valve 30. Based on the signal, various valves (directional switching valve and the like) included in the control valve 30 are switched. Accordingly, a desired amount of the hydraulic oil can be supplied the working hydraulic actuator 40 that the operator desires.

The operating means 35 according to the embodiment of the present invention is a means configured to operate the control valve 30 based on the electric signal, but the present invention is not limited to this. That is, a hydraulic type operating means may be applied, wherein pilot pressure is applied to the control valve 30 based on the operation of the operator, and the control valve 30 is operated by the pilot pressure.

As is described above, when the hydraulic type operating means is used as the operating means 35, a hydraulic pump to supply the hydraulic oil to the hydraulic type operating means and an electric motor to drive the hydraulic pump are separately provided, in such a manner that the hydraulic oil can be supplied to the hydraulic type operating means even when the engine 10 is stopped based on idling stop control described later.

The motor generator 50 drivingly rotates as the electric motor and generates motive power when electric power is supplied and generates the electric power as a generator when the motive power is supplied. The motor generator 50 includes an input and output shaft 51, and a gear 51a is fixedly disposed in the input and output shaft 51. The gear 51a is engaged with the gear 23a that is fixedly disposed with the input shaft 23 of the first hydraulic pump 21.

When the electric power is supplied, the motor generator 50 can drivingly rotate the input and output shaft 51.

When the motive power is transmitted, and the input and output shaft 51 is drivingly rotated, the motor generator 50 can generate the electric power.

The battery 60 is a secondary battery that can store the electric power supplied to the motor generator 50 and other electrical appliances and discharge electricity.

The inverter 70 is a switching means according to the first embodiment of the present invention and can supply the electric power form the battery 60 to the motor generator 50 or can supply the electric power from the motor generator 50 to the battery 60.

The inverter 70 includes a circuit (inverter circuit) to convert a direct current to an alternating current and a circuit (converter circuit) to convert the alternating current to the direct current, and selects or does not select any one of the inverter circuit and the converter circuit.

When the inverter circuit is selected, the inverter 70 converts the electric power of the direct current supplied from the battery 60 to the alternating current and supplies the alternating current to the motor generator 50. Thus, the electric power from the battery 60 is supplied to the motor generator 50 by the inverter 70, whereby the motor generator 50 drivingly rotates the input and output shaft 51. That is, in this case, the motor generator 50 can be used as the electric motor. In this case, the supply of the electric power from the motor generator 50 to the battery 60 is interrupted. Hereinafter, a state where the motor generator 50 drivingly rotates the input and output shaft 51 is referred to as "driving state".

When the converter circuit is selected, the inverter 70 converts the electric power of the alternating current supplied from the motor generator 50 to the direct current and stores the electric power in the battery 60. Thus, the inverter 70 allows the electric power from the motor generator 50 to be supplied to the battery 60, and the motor generator 50 can generate the electric power based on the motive power from the engine 10 and store (charge) the electric power in the battery 60. That is, in this case, the motor generator 50 can be used as the electric motor. In this case, the supply of the electric power from the battery 60 to the motor generator 50 is interrupted. Hereinafter, a state where the motor generator 50 charges the battery 60 is referred to as "power generation state".

When any of the inverter circuit and the converter circuit is not selected, the inverter 70 does not supply the electric power to the motor generator 50 and does not supply the electric power to the battery 60. Thus, the electric power is not supplied to the motor generator 50, so that the motor generator 50 does not allow the input and output shaft 51 to be drivingly rotated. Also, even when the input and output shaft 51 of the motor generator 50 is drivingly rotated, the electric power is not supplied to the battery 60, whereby the battery 60 is not charged. In this case, the rotational resistance of the input and output shaft 51 of the motor generator 50 is lower than the rotational resistance of the input and output shaft 51 in the power generation state. Hereinafter, a state where the motor generator 50 does not drivingly rotate the input and output shaft 51 and does not charge the battery 60 is referred to as "neutral state".

The cell motor 80 is the electric motor to start the engine 10. The cell motor 80 is driven by the electric power supplied from the battery 60.

The absorbing horsepower detecting means 110 is aimed at detecting the absorbing horsepower Lp of the first hydraulic pump 21 and the second hydraulic pump 22. Herein, the absorbing horsepower Lp is horsepower required by the first hydraulic pump 21 and the second hydraulic pump 22 for the purpose of drive. The absorbing horsepower detecting means 110 includes a first pressure detecting means 111, a second pressure detecting means 112, a first volume detecting means 113, a second volume detecting means 114, and a pump revolution detecting means 115.

The first pressure detecting means 111 is a pressure detecting means according to the first embodiment of the present invention and a sensor to detect the discharge pressure P1 of the first hydraulic pump 21. The first pressure detecting means 111 is connected to a midway portion of the oil path 25 and detects the pressure in the oil path 25, thereby detecting the discharge pressure P1 of the first hydraulic pump 21.

The second pressure detecting means 112 is a pressure detecting means according to the first embodiment of the present invention and is a sensor to detect the discharge pressure P2 of the second hydraulic pump 22. The second pressure detecting means 112 is connected to a midway portion of the oil path 26 and detects the pressure in the oil path 26, thereby detecting the discharge pressure P2 of the second hydraulic pump 22.

The first volume detecting means 113 is a volume detecting means according to the first embodiment of the present invention and is aimed at detecting the displacement volume q1 of the first hydraulic pump 21. The first volume detecting means 113 is a sensor to detect the tilt angle of the movable cam plate 21a of the first hydraulic pump 21. Base on the tilt angle of the movable cam plate 21a, the displacement volume q1 of the first hydraulic pump 21 is calculated by the main controller 100 described later.

The second volume detecting means 114 is a volume detecting means according to the first embodiment of the present invention and is aimed at detecting the displacement volume q2 of the second hydraulic pump 22. The second volume detecting means 114 is a sensor to detect the tilt angle of the movable cam plate 22a of the second hydraulic pump 22. Base on the tilt angle of the movable cam plate 22a, the displacement volume q2 of the second hydraulic pump 22 is calculated by the main controller 100 described later.

The pump revolution detecting means 115 is sensor to detect the number of revolutions Np of the first hydraulic pump 21 and the second hydraulic pump 22. The pump revolution detecting means 115 detects the number of revolution of the gear 24a fixedly disposed on the input shaft 24 of the second hydraulic pump 22, thereby detecting the number of revolutions Np of the second hydraulic pump 22. Also, the number of revolutions Np of the first hydraulic pump 21 and the second hydraulic pump 22 is equal, so that the pump revolution detecting means 115 can simultaneously detect the number of revolutions Np of the first hydraulic pump 21 by detecting the number of revolutions Np of the second hydraulic pump 22.

The operating state detecting means 116 is a sensor to detect whether the operating means 35 is operated. The operating state detecting means 116 is constituted by a potentiometer and the like and can detect that the operating means 35 is operated by an operator.

The operating state detecting means 116 according to the embodiment of the present invention is such that the potentiometer and the like directly detects that the operating means 35 is operated, but the present invention is not limited to this. That is, when the operating means 35 is of a hydraulic type, it may be constituted such that the operation of the operating means 35 is detected by detecting the pilot pressure, which operates the control valve 30, by means of a pressure switch and the like.

As is described above, when the operating means 35 is of the hydraulic type, a hydraulic pump to supply the hydraulic oil to the hydraulic type operating means and an electric motor to drive the hydraulic pump are separately provided, in such a manner that the hydraulic oil can be supplied to the hydraulic type operating means even when the engine 10 is stopped based on the idling stop control described later.

The charging state detecting means 117 is aimed at detecting the charged amount C (residual quantity) of the battery 60. The charging state detecting means 117 can detect information (for example, voltage, specific gravity of battery electrolyte, and the like) representing the charged amount C (residual quantity) of the battery 60.

The engine revolution setting means 121 is aimed at setting the number of revolutions of the engine 10. The engine revolution setting means 121 is constituted by a dial switch and can be operated by the operator. The manipulated variable of the engine revolution setting means 121 can be detected by a sensor (not shown) provided in the engine revolution setting means 121.

The engine revolution setting means 121 is not limited to the dial switch, but a lever, a pedal, and the like may be applied.

The idling stop selecting means 122 is aimed at selecting whether to carry out the idling stop control described later. The idling stop selecting means 122 is constituted by the dial switch and can be operated by the operator. The idling stop selecting means 122 can switch between "OFF" position where the idling stop control is not carried out, and "ON" position where the idling stop control is carried out, and "motor drive" position where the engine 10 is stopped, and only the motor generator 50 is driven. The position of the idling stop selecting means 122 can be detected by a sensor (not shown) provided in the idling stop selecting means 122.

The engine controller unit (hereinafter merely referred to as "ECU") 101 is a control apparatus according to the first embodiment of the present invention and aimed at controlling the operation of the engine 10 based on the various signals and programs. Specifically, the ECU 101 may be constituted by a CPU, a ROM, a RAM, a HDD, and the like, which are connected to each other via a bus, or may be constituted by one-chip LSI and the like.

The ECU 101 is connected to an engine revolution detecting means (not shown) to detect the number of revolutions Ne of the engine 10 and can obtain the detection signal of the number of revolutions Ne of the engine 10 by means of the engine revolution detecting means.

The ECU 101 is connected to the cell motor 80 and transmits the control signal to the cell motor 80, and allows the cell motor 80 to rotate the crankshaft of the engine 10, thereby starting the engine 10.

The ECU 101 is connected to an electronic-hydraulic governor (not shown) to adjust the fuel injection amount of the engine 10 and transmits the control signal to the electronic-hydraulic governor, so that the ECU 101 can change the number of revolutions Ne and the torque characteristics by adjusting the fuel injection amount of the engine 10 and stop the engine 10 by stopping the supply of fuel to the engine 10.

The main controller 100 is a control apparatus according to the first embodiment of the present invention and transmits the control signal to the clutch 15, the inverter 70, and the ECU 101 based on the various signals and programs. Specifically, the main controller 100 may be constituted by the CPU, the ROM, the RAM, the HDD, and the like, which are connected to each other via the bus, or may be constituted by one-chip LSI and the like.

The main controller 100 is connected to the first pressure detecting means 111 and can obtain the detection signal of the discharge pressure P1 of the first hydraulic pump 21 by means of the first pressure detecting means 111.

The main controller 100 is connected to the second pressure detecting means 112 and can obtain the detection signal of the discharge pressure P2 of the second hydraulic pump 22 by means of the second pressure detecting means 112.

The main controller 100 is connected to the first volume detecting means 113 and can obtain the detection signal of the tilt angle of the movable cam plate 21*a* of the first hydraulic pump 21 by means of the first volume detecting means 113. A map indicating the relation between the tilt angle of the movable cam plate 21*a* and the displacement volume q1 of the first hydraulic pump 21 is stored in the main controller 100. The main controller 100 calculates the displacement volume q1 of the first hydraulic pump 21 based on the detection signal of the tilt angle of the movable cam plate 21*a*.

The main controller 100 is connected to the second volume detecting means 114 and can obtain the detection signal of the tilt angle of the movable cam plate 22*a* of the second hydraulic pump 22 by means of the second volume detecting means 114. A map indicating the relation between the tilt angle of the movable cam plate 22*a* and the displacement volume q2 of the second hydraulic pump 22 is stored in the main controller 100. The main controller 100 calculates the displacement volume q2 of the second hydraulic pump 22 based on the detection signal of the tilt angle of the movable cam plate 22*a*.

The main controller 100 is connected to the pump revolution detecting means 115 and can obtain the detection signal of the number of revolutions Np of the first hydraulic pump 21 and the second hydraulic pump 22 by means of the pump revolution detecting means 115.

The main controller 100 is connected to the operating state detecting means 116 and can obtain the detection signal to the effect that the operating means 35 is operated, by means of the operating state detecting means 116.

The main controller 100 is connected to the charging state detecting means 117 and can obtain the detection signal of the charged amount C (residual quantity) of the battery 60 by means of the charging state detecting means 117.

The main controller 100 is connected to the ECU 101 and can obtain the detection signal of the number of revolutions Ne of the engine 10 by means of the ECU 101 (more specifically, the engine revolution detecting means connected to the ECU 101). Also, the main controller 100 can transmit the control signal indicating the start or stop of the engine 10 and the control signal indicating the instruction of the target number of revolutions of the engine 10, to the ECU 101.

The main controller 100 is connected to the sensor provided in the engine revolution setting means 121 and can obtain the detection signal of the manipulated variable of the engine revolution setting means 121 by means of the sensor.

The main controller 100 is connected to the sensor provided in the idling stop selecting means 122 and can obtain the detection signal of the position of the idling stop selecting means 122 by means of the sensor.

The main controller 100 is connected to the clutch 15 and can transmit the control signal to the effect that the clutch 15 is disconnected, to the clutch 15.

The main controller 100 is connected to the inverter 70 and can transmit the control signal to the effect that any one of the inverter circuit and the converter circuit is selected or the control signal to the effect that both the inverter circuit and the converter circuit are not selected, to the inverter 70.

Hereinafter, the basic operational mode of the power transmission apparatus 1, as is constituted above, will be described.

When a key switch not shown is operated, and a signal indicating the start of engine 10 is transmitted to the main controller 100, the main controller 100 transmits the control signal indicating the start of engine 10 to the ECU 101. Upon the reception of the control signal, the ECU 101 transmits the control signal to the cell motor 80, thereby starting the engine 10.

Also, when the key switch not shown is operated, a signal indicating the stop of engine 10 is transmitted to the main controller 100, the main controller 100 transmits the control signal indicating the stop of engine 10 to the ECU 101. Upon the reception of the control signal, the ECU 101 transmits the control signal to the electronic-hydraulic governor, thereby stopping the engine 10.

When the engine 10 starts, the main controller 100 determines the target number of revolutions of the engine 10 based on the manipulated variable of the engine revolution setting means 121. The main controller 100 transmits the target number of revolutions of the engine 10 as the control signal to the ECU 101. Upon the reception of the control signal, the ECU 101 transmits the control signal to the electronic-hydraulic governor and adjusts the number of revolutions Ne of the engine 10 in such a manner that the number of revolutions Ne of the engine 10 corresponds to the target number of revolutions.

When the engine 10 starts (drives), and the clutch 15 is connected, the motive power of the engine 10 is transmitted to the first hydraulic pump 21 via the output shaft 11, the clutch 15, and the input shaft 23. Also, the motive power of the engine 10 is transmitted to the second hydraulic pump 22 via the gear 23*a*, the gear 24*a*, and the input shaft 24. Accordingly, the first hydraulic pump 21 and the second hydraulic pump 22 rotate based on the same number of revolutions Np.

When the first hydraulic pump 21 and the second hydraulic pump 22 is rotated (driven), the hydraulic oil is discharged from the first hydraulic pump 21 and the second hydraulic pump 22. The hydraulic oil is supplied to the control valve 30 via the oil path 25 and the oil path 26. The control valve 30 supplies the hydraulic oil to the working hydraulic actuator 40 that the operator desires, based on the operating signal from the operating means 35.

On the other hand, when the control signal to the effect that the inverter circuit is selected is transmitted by the main controller 100 to the inverter 70, the motor generator 50 is switched into the driving state. In this case, the motor generator 50 drivingly rotates the input and output shaft 51 based on the electric power of the battery 60, thereby generating the motive power. The motive power is transmitted to the first hydraulic pump 21 via the input and output shaft 51, the gear 51a, the gear 23a, and the input shaft 23 and transmitted to the second hydraulic pump 22 via the gear 24a and the input shaft 24. That is, in this case, the first hydraulic pump 21 and the second hydraulic pump 22 can be driven based on the motive power from the motor generator 50, in addition to the motive power of the engine 10.

Also, when the control signal to the effect that the converter circuit is selected is transmitted by the main controller 100 to the inverter 70, the motor generator 50 is switched into the power generation state. In this case, the motor generator 50 is drivingly rotated by the motive power, which is transmitted via the gear 51a and the input and output shaft 51, from the engine 10, thereby generating the electric power. The electric power is stored in the battery 60 via the inverter 70. That is, in this case, the first hydraulic pump 21 and the second hydraulic pump 22 are driven based on the motive power from the engine 10, and the motor generator 50 is drivingly rotated, thereby storing the electric power in the battery 60.

Also, when the control signal to the effect that any of the inverter circuit and the converter circuit is not selected is transmitted by the main controller 100 to the inverter 70, the motor generator 50 is switched into the neutral state. In this case, the motor generator 50 is drivingly rotated by the motive power, which is transmitted via the gear 51a and the input and output shaft 51, from the engine 10, but the motor generator 50 does not charge the battery 60. Accordingly, the rotational resistance of the input and output shaft 51 of the motor generator 50 is small, compared with the rotational resistance in the power generation state.

Hereinafter, the control mode of the power transmission apparatus 1 will be described in detail referring to FIGS. 2 to 4.

First, the control mode of the engine 10 will be described referring to FIG. 2.

Figure 2:
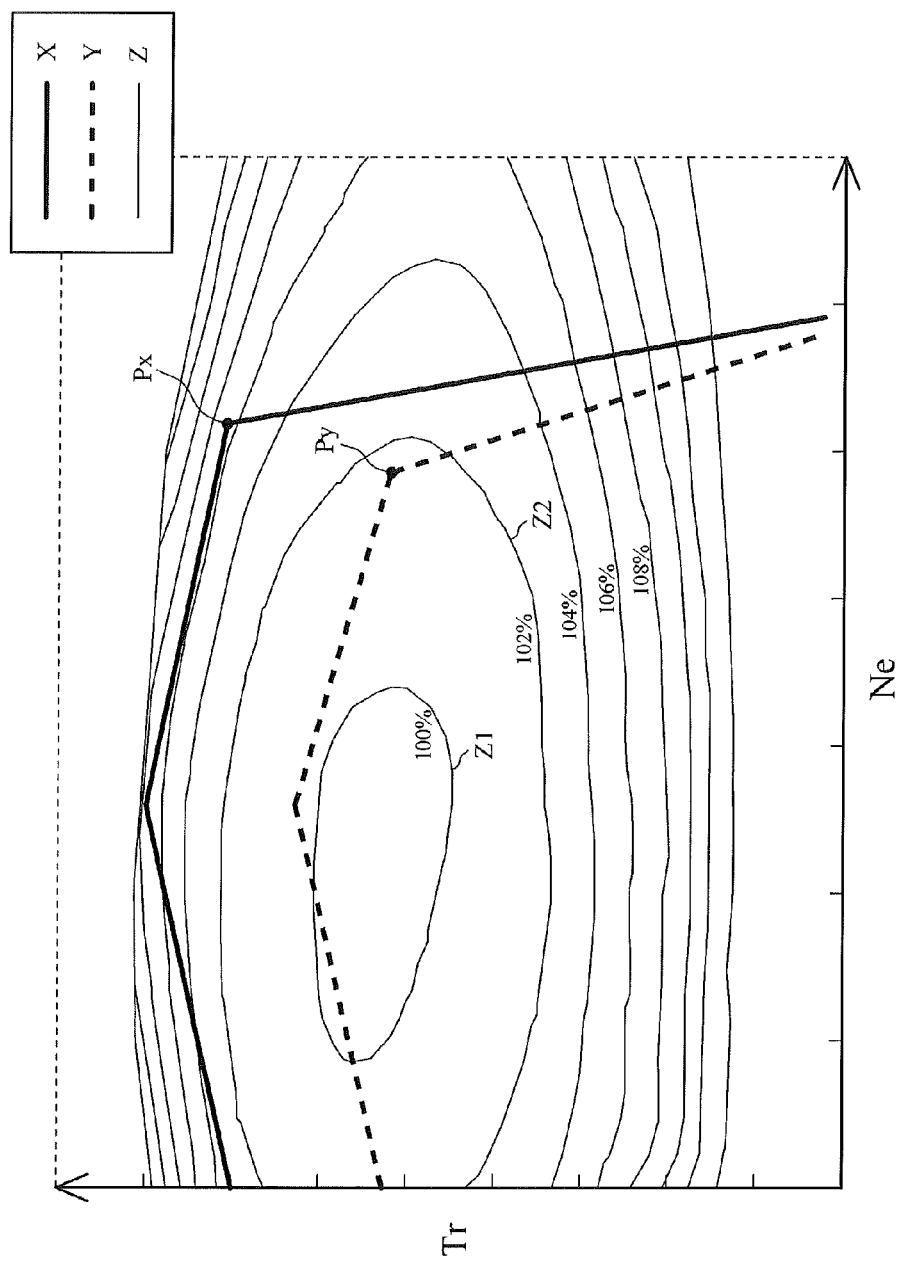
FIG. 2 is a diagram illustrating torque characteristic lines and iso-fuel consumption curves of an engine.

FIG. 2 is a diagram illustrating torque characteristic lines of the engine 10 and iso-fuel consumption curves of the engine 10. In FIG. 2, a horizontal axis represents the number of revolutions Ne of the engine 10, and a vertical axis represents torque Tr of the engine 10. Also, a thick solid line X in FIG. 2 represents an original torque characteristic line of the engine 10, and a thick dashed line Y represents a torque characteristic line after the original torque characteristic line X of the engine 10 is changed, and a thin solid line Z represents the iso-fuel consumption curve of the engine 10.

The original torque characteristic line of the engine 10 is illustrated by the thick solid line X. By the torque characteristic line is meant a line in which the maximum torque points, each of which is set for each engine revolution, are joined. On the torque characteristic line X, the rated output (rated point) Px of the engine 10 is included, and the output of the engine 10 is maximized at the rated output Px.

The iso-fuel consumption curve of the engine 10 is illustrated by the thin solid line Z. By the iso-fuel consumption curve is meant a line in which the fuel consumption rate per output of the engine 10 (hereinafter merely referred to as "fuel consumption rate") (g/kWh) is measured for each revolution and each load, and the points regarding the same fuel consumption rate are joined. In the embodiment of the present invention, as a concrete example, the fuel consumption rate at the iso-fuel consumption curve Z1 in FIG. 2 (iso-fuel consumption curve positioned at the innermost side, out of the iso-fuel consumption curves Z in the diagram) is illustrated as a reference (100%), and the iso-fuel consumption curves Z are illustrated every time the fuel consumption rate increases by 2%.

Herein, in the embodiment of the present invention, an area where the fuel consumption rate based on Z1 as a reference is equal to or less than 102% (area on the inner side of the iso-fuel consumption curve Z2) is defined as "low fuel consumption area". By the low fuel consumption area is meant an area where the fuel consumption rate of the engine 10 is less than a predetermined value (the fuel consumption rate of the engine 10 is relatively low) in FIG. 2. Herein, by "the predetermined value" is meant a value that the operator who uses the power transmission apparatus 1 can arbitrarily set and that can appropriately be set in accordance with vehicles or apparatuses in which the power transmission apparatus 1 is applied. For example, the ideal fuel consumption rate of the engine 10 (value of the minimum fuel consumption rate) is set as a reference (100%), so that the predetermined value can arbitrarily be set (for example, a value of 105% with respect to the ideal fuel consumption rate and the like).

The torque characteristic line after the original torque characteristic line X of the engine 10 has been changed is illustrated in a dashed line Y. The ECU 101 can adjust the fuel injection amount of the engine 10 in such a manner that the rated output (rated point) Py of the engine 10 is included in the low fuel consumption area described above. Accordingly, the original torque characteristic line X of the engine 10 can be changed to the torque characteristic line Y. It is noted that the rated output Py on the torque characteristic line Y is set as a value lower than the rated output Px on the torque characteristic line X.

As is described above, the engine 10 according to the embodiment of the present invention is operated in a state set based on any one of the torque characteristic line X and the torque characteristic line Y by means of the ECU 101.

Next, the control mode of the motor generator 50 will be described referring to FIGS. 2 to 4.

Before the start of control described below (initial state), it is assumed that the engine 10 is operated in the state set based on the torque characteristic line Y.

Figure 3:
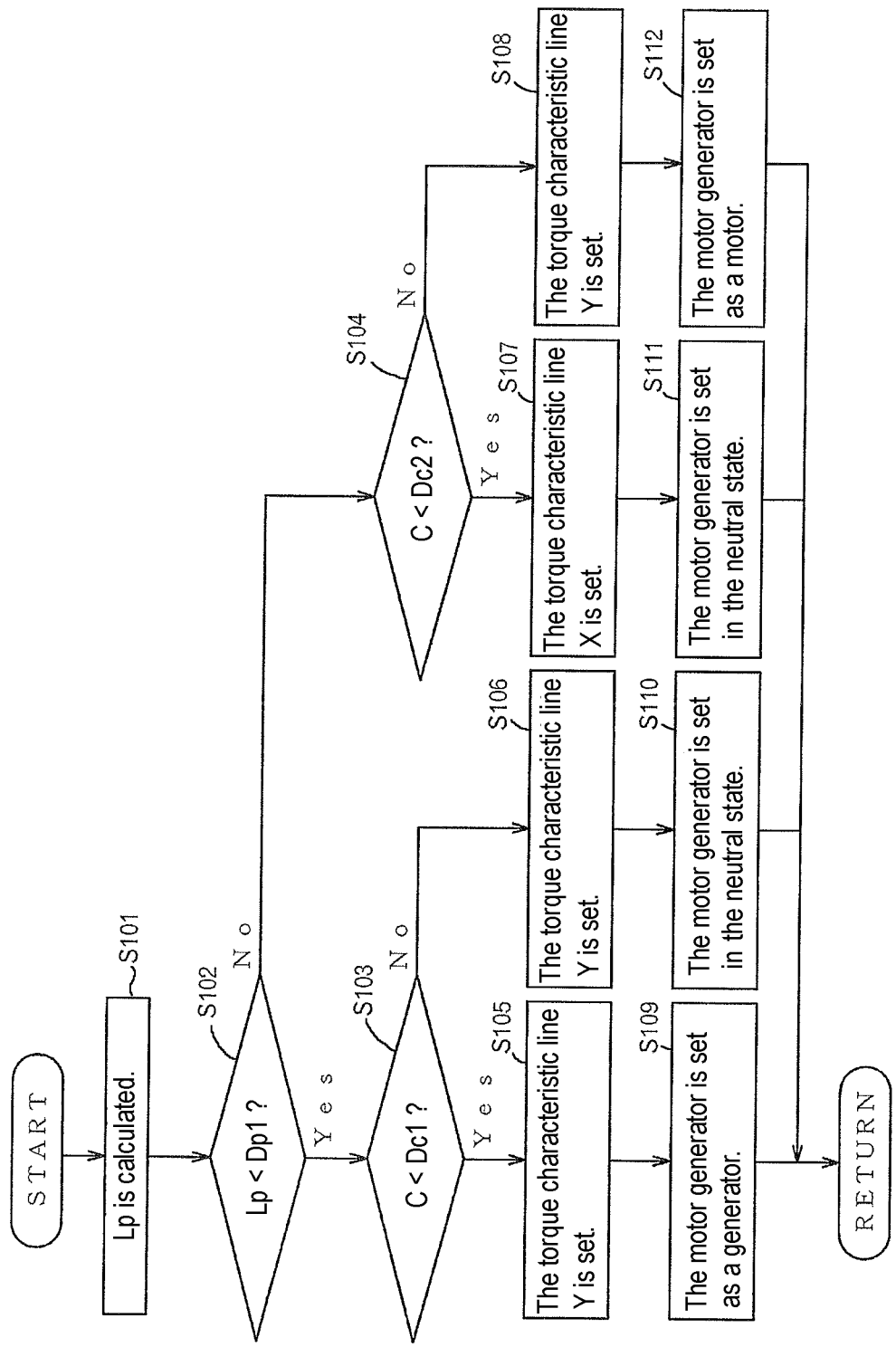
FIG. 3 is a flowchart illustrating the control mode of a motor generator.

At a step S101 in FIG. 3, the main controller 100 calculates the absorbing horsepower Lp for the first hydraulic pump 21 and the second hydraulic pump 22, based on the discharge pressure P1, the discharge pressure P2, the displacement volume q1, the displacement volume q2, and the number of revolutions Np. The absorbing horsepower Lp is calculated based on a formula "$Lp = K \times ((P1 \times q1 \times Np) + (P2 \times q2 \times Np))$" (K is a constant).

After the main controller 100 carries out the process described above, the process goes to a step S102.

At the step S102, the main controller 100 determines whether the absorbing horsepower Lp is less than a switching output threshold value Dp1 set in advance.

Herein, it is assumed that the switching output threshold value Dp1 in the embodiment of the present invention is set to the same value as the rated output Py on the torque characteristic line Y illustrated in FIG. 2. That is, the switching output threshold value Dp1 is set to a value included in the low fuel consumption area.

At the step S102, when the main controller 100 determines that the absorbing horsepower Lp is less than the switching output threshold value Dp1, the process goes to a step S103.

When the main controller 100 determines that the absorbing horsepower Lp is not lower than the switching output threshold value Dp1, that is, the absorbing horsepower Lp is equal to or higher than the switching output threshold value Dp1, the process goes to a step S104.

At the step S103, the main controller 100 determines whether the charged amount C is less than an overcharge threshold value Dc1 set in advance.

Herein, by the overcharge threshold value Dc1 is meant a value to be arbitrarily set, and the overcharge threshold value Dc1 is set to a value at which the battery 60 can be prevented from being overcharged.

At the step S103, when the main controller 100 determines that the charged amount C is less than the overcharge threshold value Dc1, the process goes to a step S105.

When the main controller 100 determines that the charged amount C is not lower than the overcharge threshold value Dc1, that is, the charged amount C is equal to or higher than the overcharge threshold value Dc1, the process goes to a step S106.

At the step S105, the main controller 100 transmits the control signal to the ECU 101 and sets the torque characteristic line of the engine 10 to Y (see FIG. 2) by means of the ECU 101 (when the torque characteristic line of the engine 10 is originally Y, the torque characteristic line Y is maintained as it is).

After the main controller 100 carries out the process described above, the process goes to a step S109.

At the step S109, the main controller 100 transmits the control signal to the effect that the converter circuit is selected, to the inverter 70, whereby the motor generator 50 is switched into the power generation state.

At the step S106, the main controller 100 transmits the control signal to the ECU 101 and sets the torque characteristic line of the engine 10 to Y (see FIG. 2) by means of the ECU 101 (when the torque characteristic line of the engine 10 is originally Y, the torque characteristic line Y is maintained as it is).

After the main controller 100 carries out the process described above, the process goes to a step S110.

At the step S110, the main controller 100 transmits the control signal to the effect that any of the inverter circuit and the converter circuit is not selected, to the inverter 70, whereby the motor generator 50 is switched into the neutral state.

At the step S104, the main controller 100 determines whether the charged amount C is less than an overdischarge threshold value Dc2 set in advance.

Herein, by the overdischarge threshold value Dc2 is meant a value to be arbitrarily set, and the overdischarge threshold value Dc2 is set to the value at which the battery 60 can be prevented from being overdischarged and the value which is lower than the overcharge threshold value Dc1.

At the step S104, when the main controller 100 determines that the charged amount C is less than an overdischarge threshold value Dc2, the process goes to a step S107.

When the main controller 100 determines that the charged amount C is not lower than the overdischarge threshold value Dc2, that is, the charged amount C is equal to or higher than the overdischarge threshold value Dc2, the process goes to a step S108.

At the step S107, the main controller 100 transmits the control signal to the ECU 101 and sets the torque characteristic line of the engine 10 to X (see FIG. 2) by means of the ECU 101 (when the torque characteristic line of the engine 10 is originally X, the torque characteristic line X is maintained as it is).

After the main controller 100 carries out the process described above, the process goes to a step S111.

At the step S111, the main controller 100 transmits the control signal to the effect that any of the inverter circuit and the converter circuit is not selected, to the inverter 70, whereby the motor generator 50 is switched into the neutral state.

At the step S108, the main controller 100 transmits the control signal to the ECU 101 and sets the torque characteristic line of the engine 10 to Y (see FIG. 2) by means of the ECU 101 (when the torque characteristic line of the engine 10 is originally Y, the torque characteristic line Y is maintained as it is).

After the main controller 100 carries out the process described above, the process goes to a step S112.

At the step S112, the main controller 100 transmits the control signal to the effect that the inverter circuit is selected, to the inverter 70, whereby the motor generator 50 is switched into the driving state.

Hereinafter, the details of the steps S109 to S112 will be described referring to FIGS. 2 to 4.

Figure 4:
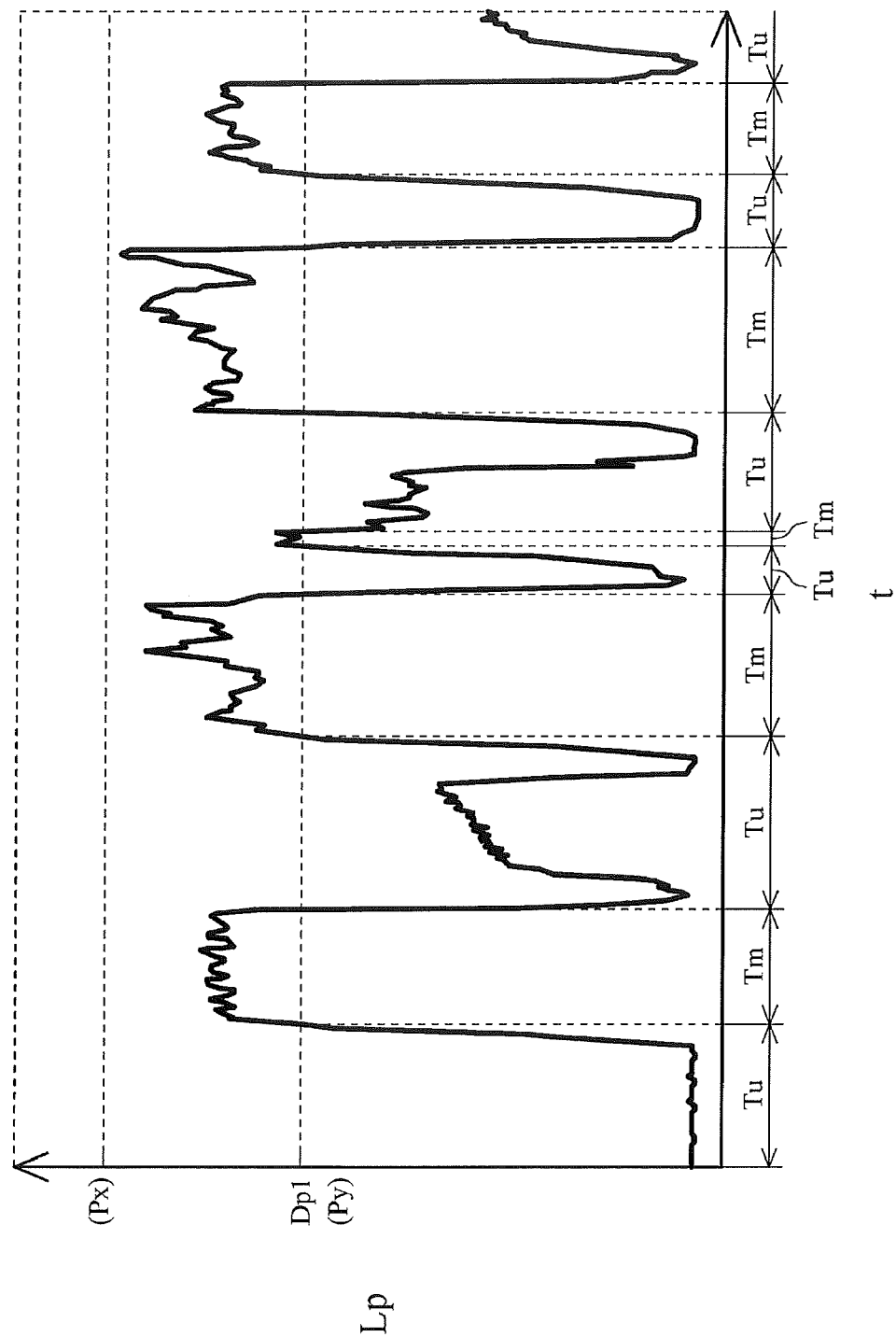
FIG. 4 is a diagram illustrating a state of change in absorbing horsepower.

FIG. 4 is a diagram a state of change (fluctuation) of the absorbing horsepower Lp for the first hydraulic pump 21 and the second hydraulic pump 22 in a case where the power transmission apparatus 1 according to the embodiment of the present invention is applied to the hydraulic excavator. In FIG. 4, a horizontal axis represents the working time t of the hydraulic excavator, and a vertical axis represents the change of the absorbing horsepower Lp respectively.

As is illustrated in FIG. 4, when the operation is carried out by the hydraulic excavator in which the power transmission apparatus 1 is applied, the absorbing horsepower Lp of the first hydraulic pump 21 and the second hydraulic pump 22 substantially fluctuates as the working time t goes by (change of the working contents).

For example, when so-called heavy load works such as "excavation loading work" in which the hydraulic excavator excavates the ground and loads a truck with earth and "travel earth removal work" in which a dozer thrusts the earth aside while the hydraulic excavator travels are carried out, the absorbing horsepower Lp increases as represented by an area Tm in FIG. 4. Also, when so-called light load works such as "shoveling work" in which earth laid on the ground is shoveled up by the hydraulic excavator and "crane work" in which goods are suspended and transferred are carried out, the absorbing horsepower Lp decreases as represented by an area Tu in FIG. 4.

In FIG. 4, the switching output threshold value Dp1 (rated output Py) and the value of the rated output Px are represented along with the absorbing horsepower Lp of the first hydraulic pump 21 and the second hydraulic pump 22.

Originally, when the control of the engine 10 and the motor generator 50 described above is not carried out, that is, when the first hydraulic pump 21 and the second hydraulic pump 22 are ordinarily driven by only the engine 10 (when a load except the first hydraulic pump 21 and the second hydraulic pump 22 is not taken into consideration), the output of the engine 10 approximately becomes equal to the absorbing horsepower Lp. In this case, in order to prevent the occurrence of the stalling of the engine 10 during the operation of the hydraulic excavator, the rated output Px is set to a value higher than the maximum value of the absorbing horsepower Lp (the torque characteristic line of the engine 10 is set to X).

However, in the embodiment of the present invention, as is described above, before the start of control described below (initial state), the torque characteristic line X of the engine 10 is changed to the torque characteristic line Y, so that the rated output Py of the engine 10 is set to a value lower than the rated output Px (see FIG. 2). As is illustrated in FIG. 4, the rated output Py in this case is set to a value lower than the maximum value of the absorbing horsepower Lp.

At the step S102 in FIG. 3, when it is determined that the absorbing horsepower Lp is less than the switching output threshold value Dp1, that is, in the area Tu in FIG. 4, the absorbing horsepower Lp is low with respect to the rated output Py of the torque characteristic line Y of the engine 10, which is a state where there is a surplus of output of the engine 10.

In this state, at the step S103, when it is determined that the charged amount C is less than the overcharge threshold value Dc1, that is, when the charged amount C of the battery 60 is low (needs to be charged), at the step S109, the motor generator 50 is switched into the power generation state.

Accordingly, the input and output shaft 51 of the motor generator 50 is drivingly rotated based on the surplus of the output of the engine 10, whereby the electric power generated by the motor generator 50 can be charged to the battery 60. In this case, the engine 10 drives the motor generator 50, in addition to the first hydraulic pump 21 and the second hydraulic pump 22, so that the output of the engine 10 amounts to a value higher than the absorbing horsepower Lp (a value lower than the switching output threshold value Dp1 (the rated output Py)).

At the step S103 in FIG. 3, when it is determined that the charged amount C is equal to or higher than the overcharge threshold value Dc1, that is, when the charged amount C of the battery 60 is substantially high (there is no need to charge), at the step S110, the motor generator 50 is switched into the neutral state.

Accordingly, even when there is a surplus of output in the engine 10, the power generation is not carried out by the motor generator 50, so that the battery 60 can be prevented from being overcharged.

At the step S102 in FIG. 3, when it is determined that the absorbing horsepower Lp is equal to or higher than the switching output threshold value Dp1, that is, in the area Tm in FIG. 4, the absorbing horsepower Lp is high with respect to the rated output Py of the torque characteristic line Y of the engine 10, which is a state where the output of the engine 10 is not sufficient.

In this state, at the step S104, when it is determined that the charged amount C is equal to or higher than the overdischarge threshold value Dc2, that is, when the charged amount C of the battery 60 is substantial (the charged amount C used to drive the motor generator 50 is sufficiently stored), at the step S112, the motor generator 50 is switched into the driving state.

Accordingly, the input and output shaft 51 of the motor generator 50 is drivingly rotated based on the electric power of the battery 60, and the first hydraulic pump 21 and the second hydraulic pump 22 are driven by the motor generator 50 as well as the engine 10. That is, the drive of the first hydraulic pump 21 and the second hydraulic pump 22 is supplemented by the motor generator 50. Thus, when the output of the engine 10 is insufficient with respect to the absorbing horsepower Lp, the motor generator 50 supplements the deficiency of the output, whereby the output of the engine 10 amounts to a value that is approximately equal to the switching output threshold value Dp1 (rated output Py).

At the step S104 in FIG. 3, when it is determined that the charged amount C is less than the overdischarge threshold value Dc2, that is, when the charged amount C of the battery 60 is low (the charged amount C used to drive the motor generator 50 is not sufficiently stored), after the torque characteristic line of the engine 10 is changed from Y to X at the step S107, the motor generator 50 is switched into the neutral state at the step S111.

Accordingly, the rated output Px of the engine 10 is set to a value higher than the maximum value of the absorbing horsepower Lp (see FIG. 4), so that the occurrence of the stalling of the engine 10 can be prevented, and the reduction of workability can be prevented.

As is described above, by controlling the engine 10 and the motor generator 50, the output of the engine 10 in the area Tu can be controlled to a value close to the rated output Py, and the output of the engine 10 in the area Tm can be controlled to a value approximately equal to the rated output Py. Accordingly, even when the absorbing horsepower Lp of the first hydraulic pump 21 and the second hydraulic pump 22 fluctuates as illustrated in FIG. 4, the output of the engine 10 can be leveled (range of fluctuation of the output of the engine 10 can be decreased).

Also, when the torque characteristic line of the engine 10 remains Y, and the output of the engine 10 is insufficient with respect to the absorbing horsepower Lp, the torque characteristic line of the engine 10 is changed to X, thereby preventing the occurrence of the stalling of the engine 10.

As is described above, the power transmission apparatus 1 according to the embodiment of the present invention includes the battery 60, the motor generator 50 that is switchable between the driving state where the input and output shaft 51 is rotated based on the supply of the electric power from the battery 60 and the power generation state where the electric power is generated by rotating the input and output shaft 51 based on the motive power from the engine 10 and the battery 60 is charged, at least a load driven by the engine 10 and/or the motor generator 50 (the first hydraulic pump 21 and the second hydraulic pump 22), a switching means (inverter 70) to switch the motor generator 50 to any of the driving state and the power generation state, the charging state detecting means 117 to detect the charged amount C of the battery 60, the absorbing horsepower detecting means 110 to detect the absorbing horsepower Lp of the load, and the control device (main controller 100) to switch the motor generator 50 into any of the driving state and the power generation state by means of the inverter 70, based on the absorbing horsepower Lp detected by the absorbing horsepower detecting means 110 and the charged amount C of the battery 60 that is detected by the charging state detecting means 117.

Based on this constitution, the operating states of the motor generator 50 can be switched corresponding to the absorbing horsepower Lp of the load and the charged amount C of the battery 60.

For example, when the absorbing horsepower Lp of the load is high, the drive of the load can be supplemented by the motor generator 50. When the absorbing horsepower Lp of the load is low, the battery 60 can be charged by the motive power of the engine 10.

Accordingly, the enhancement of fuel consumption, the reduction of noise, and the improvement of heat balance performance can be achieved, and the improvement of energy efficiency can be achieved.

Also, when the absorbing horsepower Lp detected by the absorbing horsepower detecting means 110 is less than the switching output threshold value Dp1 that is set to a value lower than the maximum output (rated output) Px of the engine 10, and the charged amount C of the battery 60 that is detected by the charging state detecting means 117 is less than the overcharge threshold value Dc1, the main controller 100 switches the motor generator 50 to the power generation state by means of the inverter 70, and when the absorbing horsepower Lp detected by the absorbing horsepower detecting means 110 is equal to or higher than the switching output threshold value Dp1, the main controller 100 switches the motor generator 50 to the driving state by means of the inverter 70.

Based on this constitution, when the absorbing horsepower Lp of the load is equal to or higher than the switching output threshold value Dp1 (in so-called heavy load works), the motor generator 50 is switched into the driving state, and the load can be driven by the engine 10 and the motor generator 50.

Accordingly, the torque characteristic line X of the engine 10 can be changed in the direction that the rated output Px is decreased (torque characteristic line Y), whereby the enhancement of fuel consumption, the reduction of noise, and the improvement of heat balance performance can be achieved.

Also, when the absorbing horsepower Lp of the load is less than the switching output threshold value Dp1 (in so-called light load works or non-works), and the charged amount C of the battery 60 is less than the overcharge threshold value Dc1, the motor generator 50 is switched into the power generation state, and the battery 60 can be charged by motive power of the engine 10 that has output to spare.

Accordingly, when the engine 10 can output much more power to spare, the battery 60 can be charged, and the improvement of energy efficiency can be achieved. Also, only when the charged amount of the battery 60 is less than the overcharge threshold value Dc1, charging is carried out, thereby preventing the battery 60 from being overcharged.

Further, the range of fluctuation of the output of the engine 10 is decreased, with regards to the driving state and the power generation state of the motor generator 50, so that the deterioration of fuel consumption, which is affected by the fluctuation of the output of the engine 10, can be suppressed.

Also, the motor generator 50 is switchable to the neutral state where the rotation of the input and output shaft 51 and the charging of the battery 60 are not carried out based on the electric power to be supplied, and the main controller 100 can increase the rated output Py of the engine 10. Even when the absorbing horsepower Lp detected by the absorbing horsepower detecting means 110 is equal to or higher than the switching output threshold value Dp1, but when the charged amount C of the battery 60 is less than the overdischarge threshold value Dc2, the rated output Py of the engine 10 is increased to Px, and the motor generator 50 is switched into the neutral state.

Based on this constitution, when the charged amount C of the battery 60 is less than the overdischarge threshold value Dc2, the drive of the motor generator 50 is stopped, whereby the overdischarge of the battery 60 can be prevented, and the occurrence of the stalling of the engine 10 can be prevented, and the reduction of workability can be prevented.

Also, the load is at least one piece of hydraulic pump (the first hydraulic pump 21 and the second hydraulic pump 22) to drive the working hydraulic actuator 40 by discharging the hydraulic oil. The absorbing horsepower detecting means 110 includes a pressure detecting means (the first pressure detecting means 111 and the second pressure detecting means 112) to detect the discharge pressure (discharge pressure P1 and discharge pressure P2) of the hydraulic pump, a volume detecting means (the first volume detecting means 113 and the second volume detecting means 114) to detect the displacement volume (displacement volume q1 and displacement volume q2) of the hydraulic pump, and the pump revolution detecting means 115 to detect the number of revolutions Np of the hydraulic pump. The main controller 100 calculates the absorbing horsepower Lp of the hydraulic pump, based on detection values by the pressure detecting means, the volume detecting means, and the pump revolution detecting means 115.

Based on this constitution, with respect to the power transmission apparatus 1 applied for the working vehicle in which the working hydraulic actuator 40 is driven using the hydraulic pump, the operating states of the motor generator 50 can be switched in accordance with the absorbing horsepower Lp of the hydraulic pump and the charged amount C of the battery 60.

Accordingly, the enhancement of fuel consumption, the reduction of noise, and the improvement of heat balance performance can be achieved, and the improvement of energy efficiency can be achieved.

Also, the switching output threshold value Dp1 is set to a value included in the low fuel consumption area set in advance.

Based on this constitution, even when the absorbing horsepower Lp of the load is increased and equal to or higher than the switching output threshold value Dp1, the output of the engine 10 can be limited to the vicinity of the low fuel consumption area.

Accordingly, the enhancement of fuel consumption of the engine 10 can be further achieved.

In the embodiment of the present invention, the first hydraulic pump 21 and the second hydraulic pump 22 are used as a load, but the present invention is not limited to this. That is, various actuators driven by the motive power of other engine 10 can be applied as the load.

Also, in the embodiment of the present invention, the first pressure detecting means 111, the second pressure detecting means 112, the first volume detecting means 113, the second volume detecting means 114, and the pump revolution detecting means 115 are used as the absorbing horsepower detecting means 110, but the present invention is not limited to this. That is, a means (various sensors and the like) to detect the absorbing horsepower of the load included in the power transmission apparatus 1 can be used as the absorbing horsepower detecting means 110.

Hereinafter, the operating mode regarding the idling stop control of the power transmission apparatus 1 will be described referring to FIGS. 5 and 6. By the idling stop control is meant the control of carrying out the automatic start and stop of the engine 10, the switching of operating states of the motor generator 50, and the connection and disconnection of the clutch 15 in predetermined cases.

When the idling stop selecting means 122 is switched to "ON" position, the main controller 100 carries out the idling stop control.

Hereinafter, the idling stop control will be described in detail referring to FIGS. 5 and 6.

Figure 5:
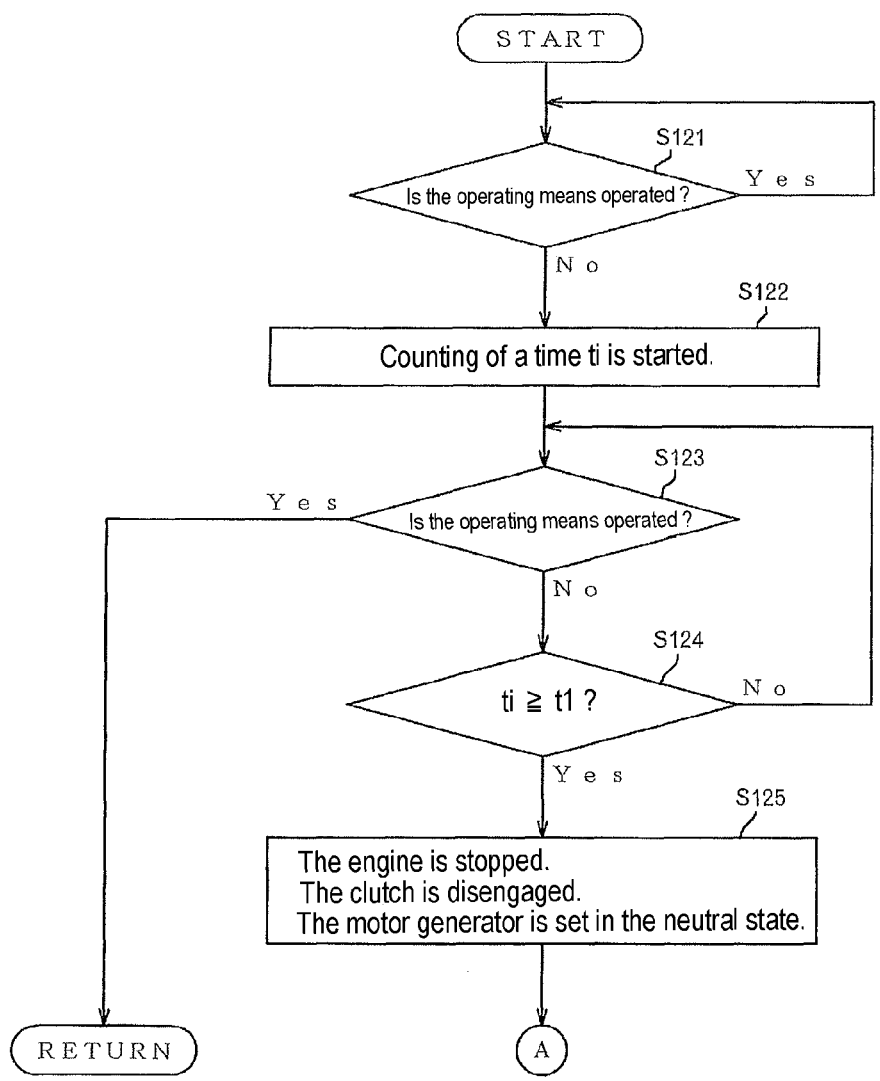
FIG. 5 is a flowchart illustrating the control mode of idling stop control.

At the step S121 in FIG. 5, the main controller 100 determines whether the operating means 35 is operated.

When the main controller 100 determines that the operating means 35 is not operated, the process goes to a step S122.

When the main controller 100 determines that the operating means 35 is operated, the process of the step S121 is carried out again.

At the step S122, the main controller 100 starts counting a non-working elapsed time ti. By the non-working elapsed time ti is meant a time during which the operating means 35 has not consecutively been operated, that is, a time during which the working hydraulic actuator 40 has not consecutively been driven (has not been under operation).

After the main controller 100 carries out the process described above, the process goes to a step S123.

At the step S123, the main controller 100 determines whether the operating means 35 is operated.

When the main controller 100 determines that the operating means 35 is not operated, the process goes to a step S124.

When the main controller 100 determines that the operating means 35 is operated, the process of the step S121 is carried out again.

At the step S124, the main controller 100 determines whether the non-working elapsed time ti is equal to or higher than a non-working determining threshold value t1.

Herein, by the non-working determining threshold value t1 is meant a value to be arbitrarily set and the non-working determining threshold value t1 is set to the value approximately equal to the non-working elapsed time ti at which the engine 10 should be stopped at the step S125 described later. That is, the non-working determining threshold value t1 is set longer than a time between operations that are intermittently carried out and desirably set to a shorter time as much as possible in view of the suppression of wasteful fuel consumption of the engine 10.

At the step S124, when the main controller 100 determines that the non-working elapsed time ti is equal to or higher than the non-working determining threshold value t1, the process goes to a step S125.

When the main controller 100 determines that the non-working elapsed time ti is not equal to or higher than the non-working determining threshold value t1, that is, when the main controller 100 determines that the non-working elapsed time ti is less than the non-working determining threshold value t1, the process of the step S123 is carried out again.

At the step S125, the main controller 100 transmits the control signal to the effect that the engine 10 is stopped, to the ECU 101. Upon the reception of the control signal, the ECU 101 stops the engine 10.

Also, the main controller 100 transmits the control signal to the effect that the clutch 15 is disconnected, to the clutch 15. Upon the reception of the control signal, the clutch 15 is disconnected, thereby interrupting the transmission of motive power between the output shaft 11 and the input shaft 23.

Further, the main controller 100 transmits the control signal to the effect that any of the inverter circuit and the converter circuit is not selected, to the inverter 70, and the motor generator 50 is switched into the neutral state.

After the main controller 100 carries out the process described above, the process goes to a step S126 (see FIG. 6).

Figure 6:
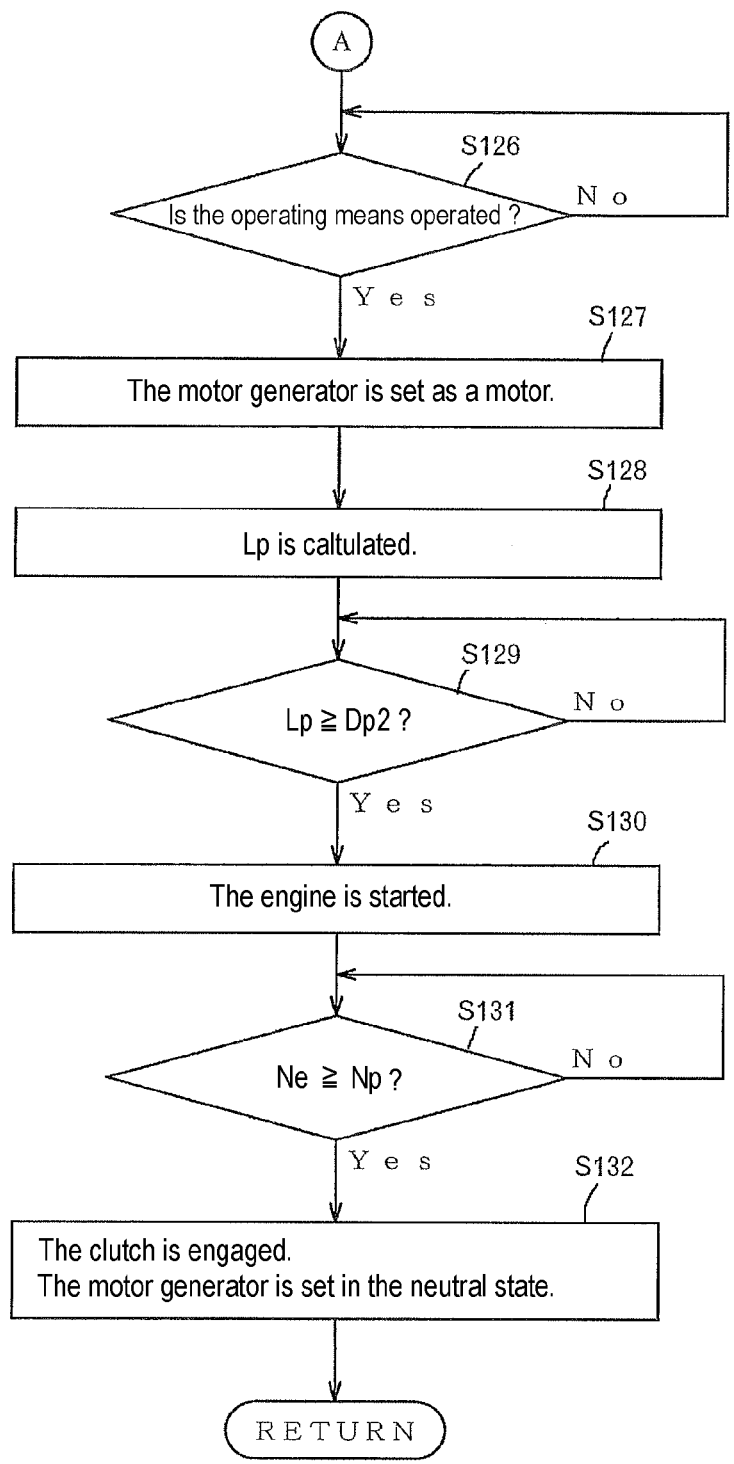
FIG. 6 is a flowchart illustrating the control mode of the idling stop control.

At the step S126 in FIG. 6, the main controller 100 determines whether the operating means 35 is operated.

When the main controller 100 determines that the operating means 35 is operated, the process goes to a step S127.

When the main controller 100 determines that the operating means 35 is not operated, the process of the step S126 is carried out again.

At the step S127, the main controller 100 transmits the control signal to the effect that the inverter circuit is selected, to the inverter 70, and the motor generator 50 is switched into the driving state.

In this case, the main controller 100 controls the number of revolutions of the motor generator 50 in such a manner that the number of revolutions Np of the first hydraulic pump 21 and the second hydraulic pump 22, which are driven by the motor generator 50, corresponds to the target number of revolutions of the engine 10 at the time of stopping the engine 10 at the step S125. Herein, in the embodiment of the present invention, when the clutch 15 is connected, the number of revolutions Ne of the engine 10 is equal to the number of revolutions Np of the first hydraulic pump 21 and the second hydraulic pump 22. That is, the control is carried out in such a manner that the number of revolutions Np of the first hydraulic pump 21 and the second hydraulic pump 22, which are driven by the motor generator 50 at the step S127, corresponds to the number of revolutions equal to the number of revolutions Np at the time of stopping the engine 10 at the step S125.

In the embodiment of the present invention, the number of revolutions Np of the first hydraulic pump 21 and the second hydraulic pump 22 is detected by the pump revolution detecting means 115, but the present invention is not limited to this. That is, the number of revolutions Np of the first hydraulic pump 21 and the second hydraulic pump 22, which are linked with the motor generator 50, can be detected by detecting the number of revolutions of the motor generator 50 based on the frequency of the inverter 70.

After the main controller 100 carries out the process described above (step S127), the process goes to a step S128.

At the step S128, the main controller 100 calculates the absorbing horsepower Lp of the first hydraulic pump 21 and the second hydraulic pump 22, based on the discharge pressure P1, the discharge pressure P2, the displacement volume q1, the displacement volume q2, and the number of revolutions Np.

After the main controller 100 carries out the process described above, the process goes to a step S129.

At the step S129, the main controller 100 determines whether the absorbing horsepower Lp is equal to or higher than a start output threshold value Dp2 set in advance.

Herein, by the start output threshold value Dp2 is meant a value to be arbitrarily set, and the start output threshold value Dp2 is set to the value equal to the absorbing horsepower Lp at which the engine 10 should be started at a step S130 described later. That is, high output (absorbing horsepower Lp) is not necessary for the start output threshold value Dp2, and it is desirable that the start output threshold value Dp2 is set to a value equal to the maximum value of the absorbing horsepower Lp at which low speed torque and smooth rotation are emphasized, in view of the suppression of wasteful fuel consumption of the engine 10.

At the step S129, when the main controller 100 determines that the absorbing horsepower Lp is equal to or higher than the start output threshold value Dp2, the process goes to a step S130.

When the main controller 100 determines that the absorbing horsepower Lp is not equal to or higher than a start output threshold value Dp2, that is, when the main controller 100 determines that the absorbing horsepower Lp is less than the start output threshold value Dp2, the process of the step S129 is carried out again.

At the step S130, the main controller 100 transmits the control signal to the effect that the engine 10 is started, to the ECU 101. Upon the reception of the control signal, the ECU 101 starts the engine 10.

After the main controller 100 carries out the process described above, the process goes to a step S131.

At the step S131, the main controller 100 determines whether the number of revolutions Ne of the engine 10 is equal to or higher than the number of revolutions Np of the first hydraulic pump 21 and the second hydraulic pump 22.

When the main controller 100 determines that the number of revolutions Ne is equal to or higher than the number of revolutions Np, the process goes to a step S132.

When the main controller 100 determines that the number of revolutions Ne is not equal to or higher than the number of revolutions Np, that is, when the main controller 100 determines that the number of revolutions Ne is less than the number of revolutions Np, the process of the step S131 is carried out again.

At the step S132, the main controller 100 transmits the control signal to the effect that the clutch 15 is connected, to the clutch 15. Upon the reception of the control signal, the clutch 15 is connected, thereby enabling the transmission of motive power between the output shaft 11 and the input shaft 23.

Also, the main controller 100 transmits the control signal to the effect that any of the inverter circuit and the converter circuit is not selected, to the inverter 70, and the motor generator 50 is switched into the neutral state.

Hereinafter, the step S125, the step S127, the step S130, and the step S132 will be described in detail.

At the step S124 in FIG. 5, when it is determined that the non-working elapsed time ti is equal to or higher than the non-working determining threshold value t1, it is assumed that the operation by the operator is suspended.

In this case, wasteful fuel consumption can be suppressed by stopping the engine 10 at the step S125. Also, the wasteful fuel consumption of electric power stored in the battery 60 can be suppressed by switching the motor generator 50 into the neutral state.

At the step S126 in FIG. 6, when it is determined that the operating means 35 is operated, it is assumed that the operation by the operator is restarted.

In this case, by switching the motor generator 50 into the driving state at the step S127, the first hydraulic pump 21 and the second hydraulic pump 22 can smoothly be driven by the motor generator 50 (electric motor) having high low-speed torque in general.

At the step S129, when it is determined that the absorbing horsepower Lp is equal to or higher than the start output threshold value Dp2, it is assumed that the absorbing horsepower Lp is high, and the first hydraulic pump 21 and the second hydraulic pump 22 should be driven by the engine 10.

In this case, at the step S130, the engine 10 can automatically be started.

At the step S131, when it is determined that the number of revolutions Ne of the engine 10 is equal to or higher than the number of revolutions Np of the first hydraulic pump 21 and the second hydraulic pump 22, it is assumed that the number of revolutions Ne of the engine 10 has reached the number of revolutions enough to drive the first hydraulic pump 21 and the second hydraulic pump 22.

In this case, the engine 10 and the first hydraulic pump 21 and the second hydraulic pump 22 can smoothly be linked by connecting the clutch 15 and switching the motor generator 50 into the neutral state at the step S132. Also, the first hydraulic pump 21 and the second hydraulic pump 22 have been driven by the motor generator 50 until the number of revolutions Ne of the engine 10 is increased up to a sufficient number of revolutions, the reduction in the number of revolutions Np of the first hydraulic pump 21 and the second hydraulic pump 22 can be prevented at the time of connecting the clutch 15.

In particular, the clutch 15 is connected when the number of revolutions Ne of the engine 10 becomes equal to the number of revolutions Np of the first hydraulic pump 21 and the second hydraulic pump 22, so that the engine 10 and the first hydraulic pump 21 and the second hydraulic pump 22 can be linked more smoothly.

In the embodiment of the present invention, when the number of revolutions Ne of the engine 10 is equal to or higher than the number of revolutions Np of the first hydraulic pump 21 and the second hydraulic pump 22 (step S131), the process goes to the step S132. However, the present invention is not limited to this.

In the embodiment of the present invention, when the clutch 15 is connected, the number of revolutions Ne of the engine 10 is equal to the number of revolutions Np of the first hydraulic pump 21 and the second hydraulic pump 22. However, for example, when a reduction gear is provided between the engine 10 and the first hydraulic pump 21 and the second hydraulic pump 22, the numbers of revolutions (the number of revolutions Ne and the number of revolutions Np) are different to each other. In this case, when the numbers of revolutions immediately before the clutch 15 (in the embodiment of the present invention, the numbers of revolutions of the output shaft 11) is equal to or higher than the numbers of revolutions immediately after the clutch 15 (in the embodiment of the present invention, the numbers of revolutions of the input shaft 23), it may be such that the process goes to the step S132.

That is, when the number of revolutions Ne of the engine 10 is equal to or higher than a predetermined value that allows the smooth linkage between the engine 10 and the first hydraulic pump 21 and the second hydraulic pump 22, the process may go to the step S132.

When the idling stop selecting means 122 is switched to "ON" position, the main controller 100 carries out the idling stop control described above. When the idling stop selecting means 122 is switched to "OFF" position, the main controller 100 does not carry out the idling stop control. That is, in this case, even when the state where the operating means 35 is not operated continues, there is no situation where the engine 10 is stopped, or the operating states of the motor generator 50 are switched. Thus, the operator switches the idling stop selecting means 122 into "ON" position or "OFF" position, so that whether the idling stop control described above is carried out or not can arbitrarily be selected.

When the idling stop selecting means 122 is switched to "motor driving" position, the main controller 100 stops the engine 10, disconnects the clutch 15, and switches the motor generator 50 into the driving state, thereby driving the first hydraulic pump 21 and the second hydraulic pump 22 only based on the motor generator 50. Thus, when the operator determines that it is not necessary to start the engine 10, the idling stop selecting means 122 is switched into "motor driving" position, so that the first hydraulic pump 21 and the second hydraulic pump 22 can be driven only by the motor generator 50 without starting the engine 10. Accordingly, the operator can arbitrarily suppress the fuel consumption of the engine 10. Also, the operations can be carried out while the engine 10 is stopped, which makes it possible to quietly carry out the operations without the generation of noise of the engine 10.

As is described above, the power transmission apparatus 1 according to the embodiment of the present invention includes the battery 60, the electric motor (the motor generator 50) that is drivingly rotated based on supply of the electric power from the battery 60, the engine 10, the cell motor 80 to start the engine 10, at least one piece of hydraulic pump (the first hydraulic pump 21 and the second hydraulic pump 22) that is driven by the motor generator 50 or the engine 10, the clutch 15 to connect and disconnect motive power transmitted from the engine 10 to the hydraulic pump, the switching means (inverter 70) to permit or interrupt the supply of the electric power from the battery 60 to the motor generator 50, the operating means 35 to operate the working hydraulic actuator 40, the operating state detecting means 116 to detect whether the operating means 35 is operated, the engine revolution detecting means configured to detect the number of revolutions Ne of the engine 10, the pump revolution detecting means 115 to detect the number of revolutions Np of the hydraulic pump, and the control device (the main controller 100 and the ECU 101) to carry out the idling stop control in such a manner that, when it is detected that the operating means 35 is not operated for a predetermined time or more (the non-working determining threshold value t1), the engine 10 is stopped, and the clutch 15 is disconnected, and the supply of the electric power from the battery 60 to the motor generator 50 is interrupted, and when it is detected that the operating means 35 is operated afterwards, the engine 10 is started by the cell motor 80, and the supply of the electric power from the battery 60 to the motor generator 50 is permitted, and the clutch 15 is connected after the number of revolutions Ne of the engine 10 reaches a predetermined value or more (the number of revolutions Np), and the supply of the electric power from the battery 60 to the motor generator 50 is interrupted.

Based on this constitution, when the working hydraulic actuator 40 is not operated, the engine 10 is stopped, whereby the wasteful fuel consumption can be suppressed.

When the engine 10 is restarted, the hydraulic pump is driven by the motor generator 50 until the number of revolutions Ne of the engine 10 reaches a predetermined value or more (the number of revolutions Np). After the number of revolutions Ne of the engine 10 reaches the predetermined value or more, the hydraulic pump is driven by the engine 10. Accordingly, even when the number of revolutions Ne of the engine 10 is low immediately after the restart of the engine 10, the reduction of the number of revolutions Np of the hydraulic pump can be prevented and the reduction of the flow rate of the hydraulic oil discharged by the hydraulic pump can be prevented. Therefore, the deterioration of the operation feeling of the working hydraulic actuator 40 at the time of restarting the engine 10 can be prevented.

Further, the clutch 15 is disconnected at the time of restarting the engine 10, so that the addition of the starting torque of the hydraulic pump to the engine 10 can be prevented. Consequently, even when the viscosity of the hydraulic oil is high, in particular, in the low temperature environment, and the starting torque of the hydraulic pump becomes higher than the starting torque in an ordinary temperature, the deterioration of the startability of the engine 10 can be prevented.

Also, the power transmission apparatus 1 includes a pressure detecting means (the first pressure detecting means 111 and the second pressure detecting means 112) to detect the discharge pressure (discharge pressure P1 and discharge pressure P2) of the hydraulic pump, and a volume detecting means (the first volume detecting means 113 and the second volume detecting means 114) to detect the displacement volume (displacement volume q1 and displacement volume q2) of the hydraulic pump. The control device calculates the absorbing horsepower Lp of the hydraulic pump, based on detection values by the pressure detecting means, the volume detecting means, and the pump revolution detecting means 115. With respect to the idling stop control, when it is detected that the operating means 35 is operated, and the absorbing horsepower Lp is less than a predetermined value (the start output threshold value Dp2), the control device permits the supply of the electric power from the battery 60 to the motor generator 50 without starting the engine 10, and when the absorbing horsepower Lp becomes equal to or higher than a predetermined value, the control device allows the engine 10 to start.

Based on this constitution, when the absorbing horsepower Lp of the hydraulic pump is low (in light load works), the hydraulic pump can be driven only by the motor generator 50 without starting the engine 10. Accordingly, the fuel consumption can be suppressed, and the hydraulic pump can be driven by the motor generator 50 that has large low-speed torque and enables smooth rotation, and the workability can be improved. Also, the operations can be carried out while the engine 10 is stopped, which makes it possible to quietly carry out the operations without the generation of noise of the engine 10.

Also, the power transmission apparatus 1 includes the idling stop selecting means 122 to select whether to carry out the idling stop control. When the selection that the idling stop control is not carried out is made by the idling stop selecting means 122, the control device does not carry out the idling stop control.

Based on this constitution, the operator can arbitrarily select whether to carry out the idling stop control.

At the step S132 in FIG. 6, the main controller 100 merely allows the clutch 15 to be connected, but the present invention is not limited to this. That is, it may be constituted such that the main controller 100 allows the clutch 15 to be connected while the output of the engine 10 is gradually increased by maintaining a so-called half-clutch state where the clutch 15 is not fully connected during a predetermined time. Accordingly, the load can be prevented from being rapidly applied to the engine 10, and the number of revolutions Ne of the engine 10 can be prevented from being rapidly reduced.

INDUSTRIAL APPLICABILITY

The present invention can be utilized for a technology of a power transmission apparatus in which an engine and an electric motor are used.

The invention claimed is:

1. A power transmission apparatus comprising:
a battery;
an electric motor configured to be drivingly rotated based on supply of electric power from the battery;
an engine;
a cell motor configured to start the engine;
at least a hydraulic pump configured to be driven by the electric motor or the engine;
a clutch configured to connect and disconnect motive power transmitted from the engine to the hydraulic pump;
a switching means configured to permit or interrupt the supply of the electric power from the battery to the electric motor;
an operating means configured to operate a working hydraulic actuator;
an operating state detecting means configured to detect whether the operating means is operated;
an engine revolution detecting means configured to detect the number of revolutions of the engine;
a pump revolution detecting means configured to detect the number of revolutions of the hydraulic pump; and
a pressure detecting means configured to detect discharging pressure of the hydraulic pump;
a volume detecting means configured to detect displacement volume of the hydraulic pump; and
a control device configured to carry out idling stop control in such a manner that, when it is detected that the operating means is not operated for a predetermined time or more, the engine is stopped, and the clutch is disconnected, and the supply of the electric power from the battery to the electric motor is interrupted, and when it is detected that the operating means is operated afterwards, the engine is started by the cell motor, and the supply of the electric power from the battery to the electric motor is permitted, and the clutch is connected after the number of revolutions of the engine reaches a predetermined value or more, and the supply of the electric power from the battery to the electric motor is interrupted, and wherein the control device calculates absorbing horsepower of the hydraulic pump, based on detection values by the pressure detecting means, the volume detecting means, and the pump revolution detecting means, wherein, with respect to the idling stop control, when it is detected that the operating means is operated, and the absorbing horsepower is less than a predetermined value, the control device permits the supply of the electric power from the battery to the electric motor without starting the engine, and wherein, when the absorbing horsepower is equal to or higher than a predetermined value, the control device allows the engine to start.

2. The power transmission apparatus according to claim 1, further comprising an idling stop selecting means configured to select whether to carry out the idling stop control, wherein, when the selection that the idling stop control is not carried out is made by the idling stop selecting means, the control device does not carry out the idling stop control.

* * * * *